United States Patent
Donovan et al.

(10) Patent No.: US 8,116,769 B2
(45) Date of Patent: Feb. 14, 2012

(54) ANCHORING A COMMUNICATION SESSION IN A MULTIPLE MODE SYSTEM

(75) Inventors: Steven R. Donovan, Plano, TX (US);
Bich T. Nguyen, Los Altos, CA (US);
Mark Grayson, Maidenhead (GB);
Christopher E. Pearce, Dallas, TX (US); Ramanathan T. Jagadeesan, San Jose, CA (US); Andrew C. Chung, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 506 days.

(21) Appl. No.: 11/347,770

(22) Filed: Feb. 3, 2006

(65) Prior Publication Data

US 2007/0183364 A1    Aug. 9, 2007

(51) Int. Cl.
*H04W 36/00* (2009.01)
(52) U.S. Cl. ........ 455/436; 455/437; 455/438; 455/439; 455/453; 370/328; 370/331; 370/338
(58) Field of Classification Search ............... 455/435.2, 455/428, 432.1, 456.1, 456.6, 438, 426.1, 455/426.2, 439, 422.1, 436, 437, 453; 370/331, 370/401, 313, 340, 231, 352, 329, 328, 338
See application file for complete search history.

(56) References Cited

U.S. PATENT DOCUMENTS

| | | | | |
|---|---|---|---|---|
| 6,157,834 A * | 12/2000 | Helm et al. | ................ | 455/436 |
| 6,424,638 B1 * | 7/2002 | Ray et al. | ................ | 370/331 |
| 7,245,913 B1 * | 7/2007 | Nguyen et al. | ............. | 455/435.2 |
| 7,301,923 B2 * | 11/2007 | Petrescu et al. | ................ | 370/331 |
| 7,693,521 B1 * | 4/2010 | Ribas et al. | ................ | 455/437 |
| 2002/0085719 A1 * | 7/2002 | Crosbie | ................ | 380/248 |
| 2004/0228304 A1 | 11/2004 | Riedel et al. | ................ | 370/332 |
| 2005/0003821 A1 * | 1/2005 | Sylvain | ................ | 455/444 |
| 2005/0271011 A1 * | 12/2005 | Alemany et al. | ............. | 370/331 |
| 2005/0286466 A1 | 12/2005 | Tagg et al. | ................ | 370/329 |
| 2006/0045056 A1 * | 3/2006 | O'Hara | ................ | 370/331 |
| 2006/0056351 A1 * | 3/2006 | Wall | ................ | 370/331 |
| 2007/0297383 A1 * | 12/2007 | Buckley et al. | ............. | 370/338 |

OTHER PUBLICATIONS

Cisco IP Telephony Solution Reference Network Design (SRND), Cisco CallManager Releases 4.0 and 4.1, Copyright © 2005 Cisco Systems, Inc., http://www.cisco.com, 20 pages, Aug. 2005.
Cisco PGW 2200 Softswitch, Introduction, © 1992-2005, Cisco Systems, Inc., http://www.cisco.com/en/US/products/hw/vcallcon/ps2027/index.html, 1 page, Printed Nov. 19, 2005.

(Continued)

*Primary Examiner* — Patrick Edouard
*Assistant Examiner* — Julio Perez
(74) *Attorney, Agent, or Firm* — Baker Botts L.L.P.

(57) ABSTRACT

Anchoring a communication session for a target mobile phone includes identifying a current access node operable to provide the target mobile phone access to a first network of a first network type. Potential access nodes operable to provide a mobile phone access to a second network of a second network type are identified. Whether the communication session can be handed off to a potential access node of the one or more potential access nodes is established. Anchoring of the communication session is initiated in the second network only if the communication session can be handed off to a potential access node of the one or more potential access nodes.

12 Claims, 1 Drawing Sheet

OTHER PUBLICATIONS

*The Cisco Call Session Control Platform: Enabling Multimedia Service Offerings for Broadband Providers*, Copyright © 2005, Cisco Systems, Inc., http://www.cisco.com, 7 pages, Printed Nov. 19, 2005.

PCT Notification of Transmittal of the International Search Report and the Written Opinion of the International Searching Authority, or the Declaration with attached PCT International Search Report and Written Opinion of the International Searching Authority in International Application No. PCT/US06/47051, dated Feb. 1, 2008, 12 pages, Feb. 1, 2008.

State Intellectual Property Office of the People's Republic of China, The First Office Action, Patent Application No. 200680041021.1, Chinese Office Action and English translation, transmitted to Baker Botts L.L.P. by foreign associate on Oct. 15, 2010, 7 pages, Oct. 15, 2010.

The People's Republic of China Second Office Action in Chinese Application No. 200680041021.1 (with translation), dated Aug. 24, 2011, 7 pages.

\* cited by examiner

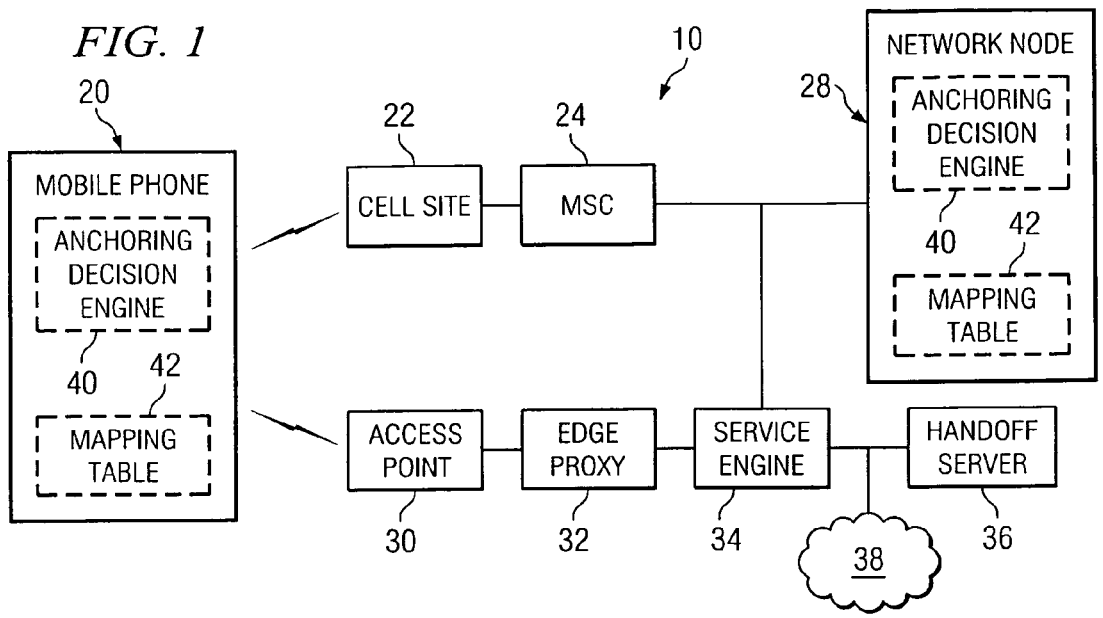
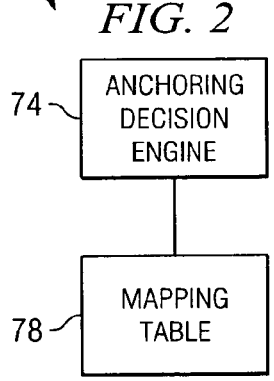
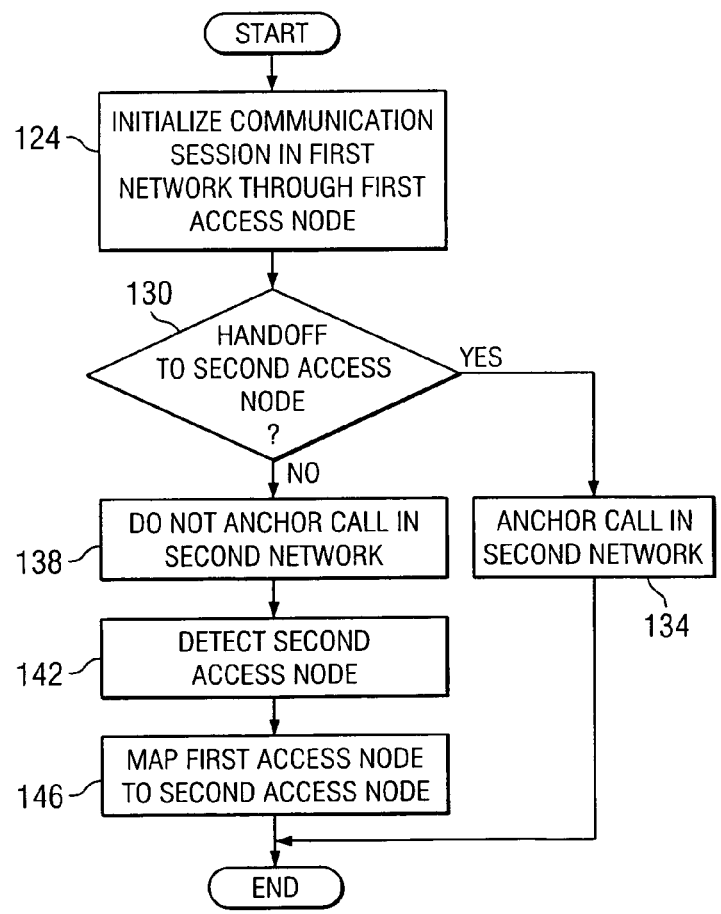

ANCHORING A COMMUNICATION SESSION IN A MULTIPLE MODE SYSTEM

TECHNICAL FIELD

This invention relates generally to the field of telecommunications and more specifically to anchoring a communication session in a multiple mode system.

BACKGROUND

A communication session for a multiple mode mobile phone is typically anchored at an anchor node of a communication network. The anchor node processes the communication session while the mobile phone is involved in a handover process. In certain cases, the mobile phone may be operable to communicate with different types of networks. For example, a multiple mode mobile phone may communicate with an access point of a Wireless Fidelity (WiFi) Voice over Internet Protocol (VoIP) network and with a cell site of a cellular network.

Certain known techniques for anchoring a communication session for a multiple mode mobile phone involve anchoring all calls in the home IP network. This anchoring requires additional resources when the mobile phone is in a cellular network. Accordingly, these techniques are not efficient in certain situations. It is generally desirable to efficiently anchor a communication session.

SUMMARY OF THE DISCLOSURE

In accordance with the present invention, disadvantages and problems associated with previous techniques for anchoring communication sessions may be reduced or eliminated.

According to one embodiment of the present invention, anchoring a communication session for a target mobile phone includes identifying a current access node operable to provide the target mobile phone access to a first network of a first network type (for example, WiFi VoIP). Potential access nodes operable to provide a mobile phone access to a second network of a second network type (for example, cellular) are identified. Whether the communication session can be handed off to a potential access node of the one or more potential access nodes is established. Anchoring of the communication session is initiated in the second network only if the communication session can be handed off to a potential access node.

Certain embodiments of the invention may provide one or more technical advantages. A technical advantage of one embodiment may be that a communication session for a mobile phone is anchored in a network only if the communication session can be handed off to an access node of the network. Another technical advantage of one embodiment may be that cellular access nodes that may result in a handoff may be configured or may be discovered. Another technical advantage of one embodiment may be that logic for selecting a cellular access node may be in the phone or in the network.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 1 is a block diagram illustrating one embodiment of a system for which an anchoring decision can be made;

FIG. 2 is a block diagram illustrating one embodiment of an anchoring decision engine that may be used with the system of FIG. 1; and FIG. 3 is a flowchart illustrating one embodiment of method for making an anchoring decision that may be used with the anchoring decision engine of FIG. 2.

DETAILED DESCRIPTION OF THE DRAWINGS

Embodiments of the present invention and its advantages are best understood by referring to FIGS. 1 through 3 of the drawings, like numerals being used for like and corresponding parts of the various drawings.

FIG. 1 is a block diagram illustrating one embodiment of a system for which an anchoring decision can be made. According to the embodiment, a cell site may facilitate a communication session for a mobile phone. The system may anchor the communication session for a mobile phone in a Wireless Fidelity (WiFi) network only if the communication session can be handed off to a WiFi access node. The access points that may potentially provide the mobile phone access to a network from the cell site may be configured or may be discovered.

According to the illustrated embodiment, system 10 operates to provide services such as communication sessions to endpoints such as mobile phone 20. A communication session, or call, may refer to an active communication between endpoints, measured from endpoint to endpoint.

Information is communicated during a communication session. Information may refer to voice, data, text, audio, video, multimedia, control, signaling, other information, or any combination of the preceding. System 10 may communicate information in packets. A packet may comprise a bundle of data organized in a specific way for transmission, and a frame may comprise the payload of one or more packets organized in a specific way for transmission. A packet-based communication protocol such as Internet Protocol (IP) may be used to communicate the packets.

System 10 includes communication networks. A communication network allows devices such as mobile phone 20 to communicate with other devices. A communication network may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

A network may utilize communication protocols and technologies to provide communication sessions. Example communication protocols and technologies include those set by the Institute of Electrical and Electronics Engineers, Inc. (IEEE) 802.xx standards such as 802.11 and 802.16 standards, the International Telecommunications Union (ITU-T) standards, the European Telecommunications Standards Institute (ETSI) standards, the Internet Engineering Task Force (IETF) standards, or other standards.

According to one embodiment, system 10 may include networks of different network types. A network type of a network may be designated in accordance with the communication protocols and technologies used for the network. Examples of networks of different network types include cellular networks, WiFi IP networks, voice over IP (VoIP)

networks, network types involving other communication protocols or technologies, or any combination of the preceding.

A cellular network may be based on any suitable cellular protocol, for example, protocols set forth by the Global System for Mobile Communications (GSM) standards or the American National Standards Institute (ANSI) 41 standards. A voice over IP network may be based on any suitable packet protocol, for example, the Session Initiation Protocol (SIP) set forth by the Internet Engineering Task Force (IETF). A voice over IP network may comprise, for example, a Third Generation Partnership Project (3GPP) 3GPP Multimedia Core Network Subsystem (IMS) network.

Other examples of networks of different network types include a public switched telephone network (PSTN), a public land mobile network (PLMN), a network-based call signaling (NCS) network, a session initiation protocol (SIP) peer network, other suitable network, or any combination of proceeding.

System 10 includes components such as devices. In general, a device may include any suitable arrangement of components operable to perform the operations of the device, and may comprise logic, an interface, memory, other component, or any suitable combination of the preceding. "Logic" may refer to hardware, software, other logic, or any suitable combination of the preceding. Certain logic may manage the operation of a device, and may comprise, for example, a processor. "Processor" may refer to any suitable device operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

According to the illustrated embodiment, system 10 includes a mobile phone 20, a cell site 22, a mobile switching center (MSC) 24, a network node 28, an access point 30, an edge proxy 32, a service engine 34, a handoff server 36, and a network 38 coupled as shown. According to the embodiment, a cell site 22 may provide mobile phone 20 access to a cellular network. Mobile phone 20 is anchored in a WiFi network only if the communication session can be handed off to a WiFi access point 30.

Mobile phone 20 represents any suitable device operable to communicate with a communication network via a wireless link. Mobile phone 20 may comprise, for example, a personal digital assistant, a computer such as a laptop, a cellular telephone, a mobile handset, or any other device operable to communicate with system 10. According to one embodiment, mobile phone 20 may be operable to communicate with different types of networks. As an example, mobile phone 20 may be operable to communicate with a cellular network and a WiFi network.

An access node may refer to a network node that couples a wireless network, such as a radio frequency (RF) network, to a wired network, such as a wired area network. An access node is associated with coverage within which the access node can communicate with mobile phone 20 via signals over a wireless link, and may provide access to mobile phone 20 within the coverage of the access node. An access node typically has an access node identifier that uniquely identifies the access node.

According to the illustrated embodiment, the access nodes include cell site 22 and access point 30. According to one embodiment, cell site 22 may refer to a cellular network cell site. Cell site 22 may comprise any suitable device operable to provide cellular wireless services to mobile phones 20 present in the coverage of cell site 22. For example, cell site 22 may include a base transceiver station and a base station controller.

Mobile switching center 24 represents a telephone switch that bridges a mobile network with another network. Mobile switching center 24 may provide services and coordinate between mobile phones 20 and other networks. Network node 28 comprises any suitable network device operable to store information and perform the operations of anchoring decision engine 40. For example, network node 28 may comprise or be associated with mobile switching center 24, handoff server 36, or other suitable network device.

According to one embodiment, access point 30 may comprise a WiFi access point. A WiFi access point may comprise any suitable device operable to provide WiFi wireless services to mobile phones 20 present in the coverage of the access point.

Edge proxy 32 ensures that a mobile phone 20 that sends messages to edge proxy 32 can receive messages. As an example, edge proxy 32 ensures that a registered mobile phone 20 can receive requests. Edge proxy 32 may communicate with mobile phone 20 using any suitable protocol, such as the Session Initiation Protocol (SIP) or the Simple Traversal of User Datagram Protocol (UDP) through Network Address Translation (NAT) (STUN) protocol.

Edge proxy 32 may perform any suitable operation to ensure that mobile phone 20 can receive messages. As an example, edge proxy 32 may support techniques for client initiated keep alive processes, and may generate SIP option requests for mobile phones 20 that do not refresh connections. As another example, edge proxy 32 may rewrite the contact header field and register requests and responses, invite requests and responses, subscribe requests and responses, and notify requests. Edge proxy 32 may replace the contact header field with an identifier pointing to edge proxy 32, and include information to allow incoming requests to be properly routed to mobile phone 20.

Service engine 34 may operate as a signaling hub for access point 30 to establish access to the WiFi network and to control anchoring decisions in handoff server 36. As an example, service engine 34 may provide SIP signaling to establish communication sessions for PSTN and IP networks, respectively. Service engine 34 may provide SIP routing, SIP registration, name resolution, NAT/FW traversal, other suitable functionality, or any combination of the preceding.

Handoff server 36 performs a handover procedure for a communication session for mobile phone 20. A handover procedure may refer to the process by which a communication session for mobile phone 20 is passed from a previous access node to a current access node as mobile phone 20 moves from the coverage of the previous access node to the coverage of the current access node. Network 38 represents a communication network that allows devices such as mobile phone 20 to communicate with other devices.

Anchoring decision engine 40 makes decisions regarding anchoring a communication session, and may be located at mobile phone 20 or network node 28. A communication session may be anchored at an anchor node of a network. Anchoring a communication session at an anchor node may refer to having the anchor node process signaling of the communication session. A communication session is typically anchored before call setup, and is anchored during a handover procedure.

Anchoring a communication session in a network may reduce efficiency, especially in cases where a handoff to the network cannot occur. For example, mobile phone 20 may have a home IP network in the United States. If the mobile phone 20 travels to Singapore, and if the communication session is anchored in the United States, the communication session would require two international call legs. Accordingly, if handoff to the home IP network cannot occur, then anchoring the communication session in the home IP network reduces efficiency.

According to one embodiment, if a communication session is initiated in a first network, anchoring decision engine 40 may decide to anchor the communication session in a second network only if there is a possibility of handoff to the second network. As an example, a communication session in a cellular network is anchored in a WiFi network only if there is a possibility of handoff to the WiFi network. If there is no possibility of handoff, then the anchoring process in the second network is not be invoked. An example of anchoring decision engine 40 is described with reference to FIG. 2.

Anchoring decision engine 40 may use mapping table 42 to determine if there is a possibility of handoff to the second network. Mapping table 42 associates first access nodes of a first network with second access nodes of a second network. A second access node may be associated with one or more first access nodes if a communication session facilitated by a first access node can be handed off to the second access node. According to the illustrated embodiment, mapping table 42 may be stored in the memory of mobile phone 20 or in the memory of network node 28. An example of mapping table 42 is described with reference to FIG. 2.

Anchoring may be performed in any suitable manner. According to one embodiment, mobile phone 20 may first call the IP network, and the call is anchored in the IP network. Mobile phone 20 provides the IP network with the number of the called party, and the call is routed from the IP network to the called party. According to a second embodiment, an intelligent network layer redirects a communication session to the voice IP network by querying a service control function.

System 10 may include other suitable devices, such as a gateway, a home agent, a foreign agent, an authorization server, other device, or any combination of the preceding. A gateway represents any suitable device operable to interconnect with a network, and may convert communications between different communication protocols. A home agent of a mobile phone may refer to an agent that maintains the address of the mobile phone and forwards data to the mobile phone. A foreign agent of a mobile phone may refer to an agent that provides the home agent of the mobile phone with an address to which data for the mobile phone may be forwarded. An authorization server may represent any suitable device operable to provide authorization-related services.

One or more components of system 10 may operate on one or more computers and may include appropriate input devices, output devices, mass storage media, processors, memory, or other components for receiving, processing, storing, and communicating information according to the operation of system 10. As used in this document, the term "computer" refers to any suitable device operable to accept input, process the input according to predefined rules, and produce output, for example, a personal computer, work station, network computer, wireless telephone, personal digital assistant, one or more microprocessors within these or other devices, or any other suitable processing device.

Modifications, additions, or omissions may be made to system 10 without departing from the scope of the invention. The components of system 10 may be integrated or separated according to particular needs. Moreover, the operations of system 10 may be performed by more, fewer, or other modules. Additionally, operations of system 10 may be performed using any suitable logic. As used in this document, "each" refers to each member of a set or each member of a subset of a set.

FIG. 2 is a block diagram illustrating one embodiment of a system that includes an anchoring decision engine that may be used with the system of FIG. 1. According to the illustrated embodiment, system 50 includes an anchoring decision engine 74 and a mapping table 78 coupled as shown.

Anchoring decision engine 74 determines whether to anchor a communication session in a particular network. According to one embodiment, anchoring decision engine 74 may identify a current cell site 22 for a communication session for a target mobile phone 50, where the current cell site 22 is providing access to a cellular network. Anchoring decision engine 74 may identify potential access points 30 operable to provide access to a WiFI network. Anchoring decision engine 74 establishes whether the communication session can be handed off to a potential access point 30 of the potential access points 30. The communication session is anchored in the WiFI network only if the communication session can be handed off to a potential access point 30.

Anchoring decision engine 74 may use any suitable method to determine whether to anchor a communication session in a particular network. An example method is described with reference to FIG. 3.

Mapping table 78 associates first access nodes of a first network with second access nodes of a second network. A second access node may be associated with a first access node if a communication session facilitated by the first access node can be handed off to the second access node. As an example, a WiFi access point 30 may be associated with cell site 22 if a communication session facilitated by cell site 22 can be handed off to WiFi access point 30.

Mapping table 78 may include any suitable associations. As a first example, a second access node may be associated with a first access node if the coverage of the second access node partially or completely overlaps the coverage of the first access node.

As a second example, a second access node may be associated with a set of first access nodes if there is sufficient probability, for example, greater than 90%, that the second access node can provide access to a mobile phone currently served by a first access node of the set. For instance, the set of first access nodes may include nodes that a mobile phone may use while traveling from a current first access node. If the coverage of the second access node may overlap the coverage of at least one of the nodes of the set, there is sufficient probability that the second access node can provide access.

The associations may be gathered in any suitable manner. According to one embodiment, the associations may be configured into mapping table 78. Mapping table 78 may be updated by downloading updated associations into mapping table 78.

According to another embodiment, the associations may be discovered and then stored in mapping table 78. According to the embodiment, a communication session may use a set of cell sites 22. None of the cell sites 22 are mapped to an access point 30, so the communication session is not handed off. Mobile phone 20, however, may detect coverage by an access point 30. The set of cell sites 22 may be associated with the access point 30 and stored in mapping table 78 for future use.

The associations may be discovered by any suitable device. According to one embodiment, a network device such as network node 28 may discover the associations. According to another embodiment, mobile phone 20 may discover the associations and then communicate discovered associations to mapping table 78. The discovery of the associations may be performed in any suitable manner. As an example, a user of a device, such as mobile phone 20, may initiate discovery of the associations by selecting a discovery option. In response, the device may record the associations. As another example, the device may automatically record the associations.

Anchoring decision engine 74 and mapping table 78 may be embodied at any suitable device. As an example, anchoring decision engine 74 may be embodied in mobile phone 20 or in network node 28. Anchoring decision engine 74 embodied in mobile phone 20 or network node 28 may allow mobile phone 20 to originate a communication session from a cellular network. Anchoring decision engine 74 embodied in network node 28 may allow another device to call mobile phone 20. As another example, mapping table 78 may be embodied in mobile phone 20 or in network node 28.

Modifications, additions, or omissions may be made to system 50 without departing from the scope of the invention. The components of system 50 may be integrated or separated according to particular needs. Moreover, the operations of system 50 may be performed by more, fewer, or other modules. Additionally, operations of system 50 may be performed using any suitable logic.

FIG. 3 is a flowchart illustrating one embodiment of a method for making an anchoring decision that may be used with the anchoring decision engine of FIG. 2. The method may be used for mobile phone 20 that is initialized in a first network of a first network type, such as a cellular network. Mobile phone 20 may be anchored in second network of a second network type, such as a WiFi IP network, if the communication session can be handed off to an access node of the second network.

A communication session for mobile phone 20 is initialized in a first network through a first access node at step 124. For example, mobile phone 20 may be initialized in a cellular network through cell site 22. Anchoring decision engine 74 determines whether the communication session can be handed off to a second access node of a second network at step 130. For example, anchoring decision engine 74 may determine whether the communication session can be handed off to access point 30 of the WiFi network. The determination may be made using mapping table 78.

If the communication session can be handed off at step 130, the method proceeds to step 134. The communication session is anchored in the second network at step 134. For example, the communication session may be anchored in the WiFi network. If anchoring decision engine 74 is located at mobile phone 20, engine 74 may instruct mobile phone 20 to send messages to have the cellular network to route the session through the WiFi network. If anchoring decision engine 74 is located at network node 28, engine 74 may instruct network node 28 to route the session through the WiFi network. After anchoring the communication session, the method terminates.

If the communication session cannot be handed off at step 130, the method proceeds to step 150. The communication session is not anchored in the second network at step 150. For example, the communication session may remain in the cellular network. If the communication session cannot be handed off, there is no need to anchor the communication session in the second network. If anchoring decision engine 74 is located at mobile phone 20, engine 74 may instruct mobile phone 20 to send messages that maintain the session in the cellular network. If anchoring decision engine 74 is located at network node 28, engine 74 may instruct network node 28 to maintain the session in the cellular network.

Mobile phone 20 detects coverage by a second access node of a second network type at step 142. For example, mobile phone 20 may detect coverage by access point 30 of a WiFi network. The first access node is mapped to the second access node at step 146 for future use. For example, cell site 22 is mapped to access point 30. After mapping the access nodes, the method terminates.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that a communication session for a mobile phone is anchored in a network only if the communication session can be handed off to an access node of the network. Another technical advantage of one embodiment may be that cellular access nodes that may result in a handoff may be configured or may be discovered. Another technical advantage of one embodiment may be that logic for selecting a cellular access node may be in the phone or in the network.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for anchoring a communication session, comprising:

receiving, at a handoff server, a plurality of associations discovered by a target mobile phone, an association indicating that coverage of a first access node at least partially overlaps coverage of a second access node;

identifying a current access node for a communication session for the target mobile phone, the current access node operable to provide the target mobile phone access to a first network of a first network type;

identifying one or more potential access nodes, a potential access node operable to provide the target mobile phone access to a second network of a second network type;

determining, by the handoff server, from the plurality of associations if coverage of the potential access node at least partially overlaps coverage of an access node of a set of access nodes, the set of access nodes providing contiguous coverage that at least partially overlaps coverage of the current access node;

deciding, by the handoff server, that the communication session can be handed off from the current access node to a potential access node if coverage of the potential access node at least partially overlaps coverage of an access node of the set of access nodes; and initiating anchoring of the communication session in the second network only if the communication session can be handed off to a potential access node of the one or more potential access nodes.

2. The method of claim 1, wherein:

the current access node further comprises a cell site;

the first network type refers to a cellular network;
the potential access node further comprises a Wireless Fidelity access point; and
the second network type refers to a Wireless Fidelity network.

3. The method of claim 1, wherein identifying one or more potential access nodes further comprises:
configuring one or more potential access node identifiers in a mapping table, each potential access node identifier identifying a potential access node of the one or more potential access nodes; and
identifying the one or more potential access nodes from the mapping table.

4. The method of claim 1, wherein identifying one or more potential access nodes further comprises:
discovering the one or more potential access nodes;
storing one or more potential access node identifiers in a mapping table, each potential access node identifier identifying a discovered potential access node of the one or more discovered potential access nodes; and
identifying the one or more potential access nodes from the mapping table.

5. The method of claim 1, further comprising:
storing the plurality of associations in a mapping table at the handoff server.

6. A system for anchoring a communication session, comprising:
an interface of a handoff server, the interface operable to receive a plurality of associations discovered by a target mobile phone, an association indicating that coverage of a first access node at least partially overlaps coverage of a second access node; and
an anchoring decision engine of the handoff server, the engine operable to:
identify a current access node for a communication session for the target mobile phone, the current access node operable to provide the target mobile phone access to a first network of a first network type;
identify one or more potential access nodes, a potential access node operable to provide the target mobile phone access to a second network of a second network type;
determine from the plurality of associations if coverage of the potential access node at least partially overlaps coverage of an access node of a set of access nodes, the set of access nodes providing contiguous coverage that at least partially overlaps coverage of the current access node; and
decide that the communication session can be handed off from the current access node to a potential access node if coverage of the potential access node at least partially overlaps coverage of an access node of the set of access nodes; and
initiate anchoring of the communication session in the second network only if the communication session can be handed off to a potential access node of the one or more potential access nodes.

7. The system of claim 6, wherein:
the current access node further comprises a cell site;
the first network type refers to a cellular network;
the potential access node further comprises a Wireless Fidelity access point; and
the second network type refers to a Wireless Fidelity network.

8. The system of claim 6, the anchoring decision engine further operable to identify one or more potential access nodes by:
configuring one or more potential access node identifiers in a mapping table, each potential access node identifier identifying a potential access node of the one or more potential access nodes; and
identifying the one or more potential access nodes from the mapping table.

9. The system of claim 6, the anchoring decision engine further operable to identify one or more potential access nodes by:
discovering the one or more potential access nodes;
storing one or more potential access node identifiers in a mapping table, each potential access node identifier identifying a discovered potential access node of the one or more discovered potential access nodes; and
identifying the one or more potential access nodes from the mapping table.

10. The system of claim 6, further comprising:
a memory operable to store the plurality of associations in a mapping table at the handoff server.

11. A system for anchoring a communication session, comprising:
means for receiving, at a handoff server, a plurality of associations discovered by a target mobile phone, an association indicating that coverage of a first access node at least partially overlaps coverage of a second access node;
means for identifying a current access node for a communication session for the target mobile phone, the current access node operable to provide access to a first network of a first network type;
means for identifying one or more potential access nodes, a potential access node operable to provide access to a second network of a second network type;
means for determining, by the handoff server, from the plurality of associations if coverage of the potential access node at least partially overlaps coverage of an access node of a set of access nodes, the set of access nodes providing contiguous coverage that at least partially overlaps coverage of the current access node;
means for deciding, by the handoff server, that the communication session can be handed off from the current access node to a potential access node if coverage of the potential access node at least partially overlaps coverage of an access node of the set of access nodes; and
means for anchoring the communication session in the second network only if the communication session can be handed off to a potential access node of the one or more potential access nodes.

12. A method for anchoring a communication session, comprising:
receiving, at a handoff server, a plurality of associations discovered by a target mobile phone, an association indicating that coverage of a first access node at least partially overlaps coverage of a second access node;
identifying a current access node for a communication session for the target mobile phone, the current access node further comprising a cell site, the current access node operable to provide the target mobile phone access to a first network of a first network type, the first network type referring to a cellular network, the one or more potential access nodes identified by:
configuring one or more potential access node identifiers in a mapping table, each potential access node identifier identifying a potential access node of the one or more potential access nodes; and
discovering the one or more potential access nodes;

storing one or more potential access node identifiers in a mapping table, each potential access node identifier identifying a discovered potential access node of the one or more discovered potential access nodes; and identifying the one or more potential access nodes from the mapping table;

identifying one or more potential access nodes, a potential access node operable to provide the target mobile phone access to a second network of a second network type, the potential access node further comprises a Wireless Fidelity access point, the second network type referring to a Wireless Fidelity network; and determining if coverage of the potential access node at least partially overlaps coverage of the current access node; and determining, by the handoff server, from the plurality of associations if coverage of the potential access node at least partially overlaps coverage of an access node of a set of access nodes, the set of access nodes comprising access nodes proximate to the current access node, the set of access nodes providing contiguous coverage;

deciding, by the handoff server, that the communication session can be handed off from the current access node to a potential access node if coverage of the potential access node at least partially overlaps coverage of an access node of the set of access nodes; and initiating anchoring of the communication session in the second network only if the communication session can be handed off to a potential access node of the one or more potential access nodes.

* * * * *